United States Patent
Chuang et al.

(10) Patent No.: US 8,508,531 B2
(45) Date of Patent: Aug. 13, 2013

(54) GRAPHING METHOD FOR PRESENTING VALUES ASSOCIATED WITH TWO DATA SETS, GRAPHING APPARATUS, AND COMPUTER PROGRAM PRODUCT STORING A PROGRAM FOR EXECUTING THE GRAPHING METHOD

(75) Inventors: Chang-Shan Chuang, Taipei (TW); Hao-Yuan Chuang, Taipei (TW)

(73) Assignee: Chii Ying Co., Ltd., Taipei (TW)

( * ) Notice: Subject to any disclaimer, the term of this patent is extended or adjusted under 35 U.S.C. 154(b) by 686 days.

(21) Appl. No.: 12/759,294

(22) Filed: Apr. 13, 2010

(65) Prior Publication Data
US 2011/0063299 A1   Mar. 17, 2011

(30) Foreign Application Priority Data
Sep. 15, 2009   (TW) ................................. 98131054 A

(51) Int. Cl.
*G06T 11/20*   (2006.01)
(52) U.S. Cl.
USPC .......................................................... 345/440
(58) Field of Classification Search
USPC .......................................................... 345/440
See application file for complete search history.

(56) References Cited

U.S. PATENT DOCUMENTS

| | | | | |
|---|---|---|---|---|
| 6,008,817 A | * | 12/1999 | Gilmore, Jr. ................... | 345/440 |
| 6,567,777 B1 | * | 5/2003 | Chatterjee ...................... | 704/246 |
| 7,432,926 B1 | * | 10/2008 | Cherkas ......................... | 345/440 |

* cited by examiner

*Primary Examiner* — Xiao M. Wu
*Assistant Examiner* — Charles Tseng
(74) *Attorney, Agent, or Firm* — Dickstein Shapiro LLP

(57) ABSTRACT

A graphing method is implemented by a graphing apparatus and includes: (a) receiving a first value and a second value, and reference information corresponding to the first and second values; (b) determining an angle value using the first value and the second value, step (b) including (b-1) calculating a relational value by determining the quotient of a numerator and a denominator, in which the denominator is a function of the first value and the numerator is a function of at least the second value, and (b-2) obtaining the angle value by inputting the relational value in a predetermined inverse trigonometric function; (c) generating a graph having presented thereon a coordinate value formed using the angle value and the reference information; and (d) outputting the graph to a display medium for display thereon. A computer program product and a graphing apparatus are also disclosed.

21 Claims, 15 Drawing Sheets

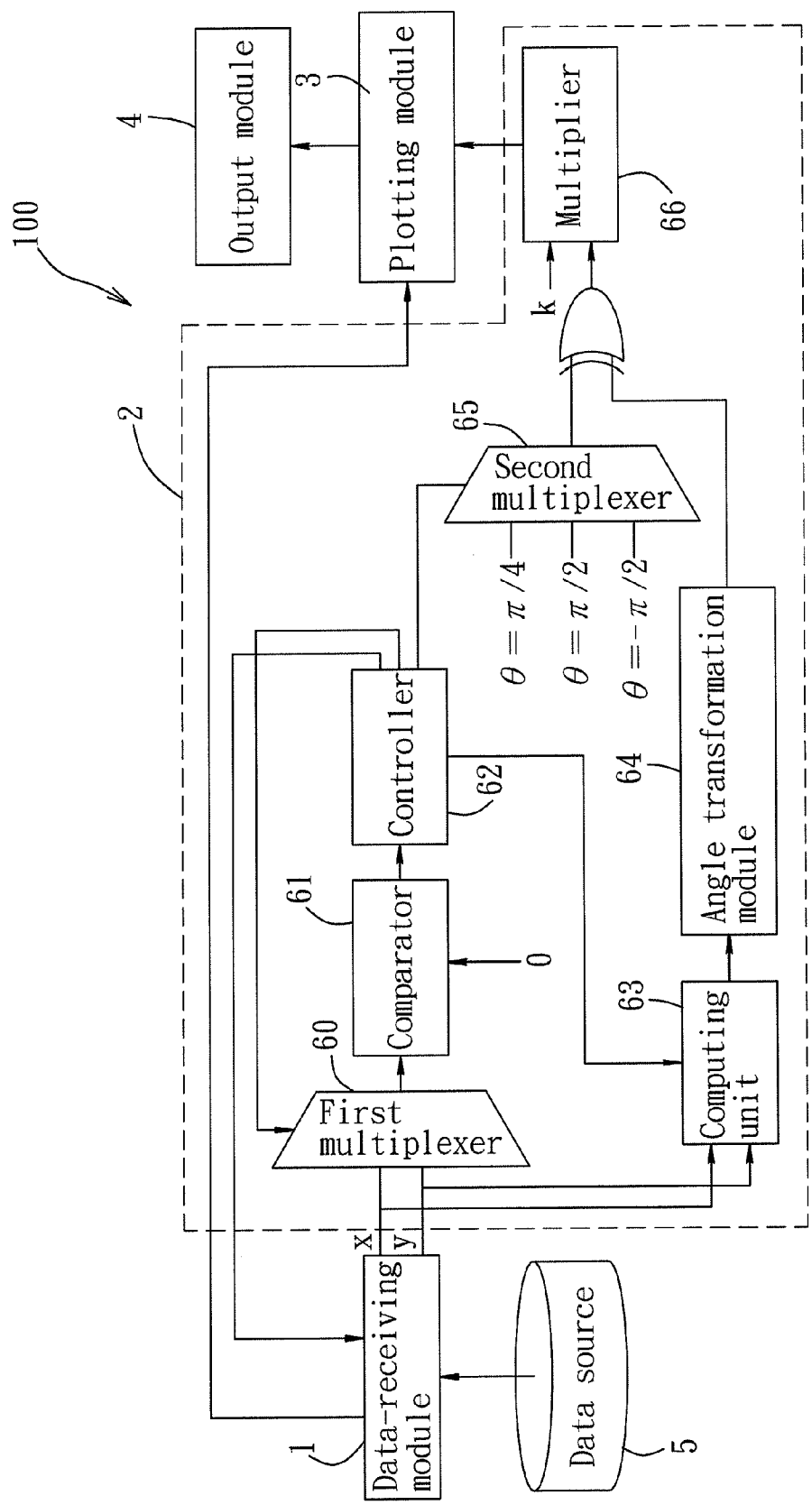
F I G. 14

GRAPHING METHOD FOR PRESENTING VALUES ASSOCIATED WITH TWO DATA SETS, GRAPHING APPARATUS, AND COMPUTER PROGRAM PRODUCT STORING A PROGRAM FOR EXECUTING THE GRAPHING METHOD

BACKGROUND OF THE INVENTION

1. Field of the Invention

The present invention relates to a graphing method for presenting values associated with two data sets, in which processing of zero and negative denominator values is possible, and angle transformation is performed prior to plotting on a graph such that graph compression is not required. The present invention also relates to a graphing apparatus and a computer program product that stores a program for executing the graphing method.

2. Description of the Related Art

It is often desirable to compare two data sets. One way to accomplish this is to calculate ratios in which the denominator is a function of a value from the first data set and the numerator is a function of at least a corresponding value from the second data set. For example, a value of a present period may be divided by a corresponding value of a previous period and the resulting quotient multiplied by 100% to thereby obtain what is referred to herein as a completion rate. As another example, a value of the previous period may be subtracted from a corresponding value of the present period, the resulting difference divided by the value of the previous period, and this resulting quotient multiplied by 100% to thereby obtain what is referred to herein as a growth rate.

However, when the denominator is zero, it is neither possible to calculate the completion rate nor the growth rate. Such values may appear as NA (not available) when presented in a table, or may appear as breaks or empty spaces when presented on a graph.

Furthermore, when the denominator used in calculating the completion rate or the growth rate is small, the resulting completion rate or growth rate is a very large value. One consequence of this is that the graph may need to be compressed so that all values appear on the graph. However, this may make it impossible to discern variations in the completion rates or growth rates that are not large. One conventional way in which this problem is dealt with involves the use of logarithms. While a marked improvement in this regard is realized with the use of logarithms, it is not possible to obtain the log of zero and negative values. Such points are unable to be presented on the graph.

SUMMARY OF THE INVENTION

Therefore, the object of the present invention is to provide a graphing method for presenting on a graph values associated with two data sets that are to be compared, in which no compression is required for the resulting graph, and values of all types, including zero and negative denominator values, can be processed. The present invention also provides a graphing apparatus and a computer program product that stores a program for executing of the graphing method.

According to a first aspect of this invention, the graphing method is implemented by a graphing apparatus that includes a receiving module, an angle-determining unit, a plotting module, and an output module. The graphing method comprises: (a) configuring the receiving module to receive a first value and a second value, and reference information corresponding to the first and second values; (b) configuring the angle-determining unit to determine an angle value using the first value and the second value, step (b) including (b-1) configuring a relational value module of the angle-determining unit to calculate a relational value by determining the quotient of a numerator and a denominator, in which the denominator is a function of the first value and the numerator is a function of at least the second value, and (b-2) configuring an angle transformation module of the angle-determining unit to obtain the angle value by inputting the relational value in a predetermined inverse trigonometric function; (c) configuring the plotting module to generate a graph having presented thereon a coordinate value formed using the angle value and the reference information; and (d) configuring the output module to output the graph to a display medium for display thereon.

According to a second aspect of this invention, the computer program product comprises a computer-readable storage medium that stores a graphing program for causing a graphing apparatus that includes a receiving module, an angle-determining unit, a plotting module, and an output module to execute steps of a graphing method including: (a) configuring the receiving module to receive a first value and a second value, and reference information corresponding to the first and second values; (b) configuring the angle-determining unit to determine an angle value using the first value and the second value, step (b) including (b-1) configuring a relational value module of the angle-determining unit to calculate a relational value by determining the quotient of a numerator and a denominator, in which the denominator is a function of the first value and the numerator is a function of at least the second value, and (b-2) configuring an angle transformation module of the angle-determining unit to obtain the angle value by inputting the relational value in a predetermined inverse trigonometric function; (c) configuring the plotting module to generate a graph having presented thereon a coordinate value formed using the angle value and the reference information; and (d) configuring the output module to output the graph to a display medium for display thereon.

According to a third aspect of this invention, the graphing apparatus comprises: a data-receiving module for receiving a first value and a second value, and reference information corresponding to the first and second values; an angle-determining unit coupled to the data-receiving module to receive the first and second values therefrom, the angle-determining unit determining an angle value using the first value and the second value, the angle-determining unit including a relational value module for calculating a relational value by determining the quotient of a numerator and a denominator, in which the denominator is a function of the first value, and the numerator is a function of at least the second value, and an angle transformation module for obtaining the angle value by inputting the relational value in a predetermined inverse trigonometric function; a plotting module coupled to the data-receiving module and the angle-determining unit, the plotting module generating a graph having presented thereon a coordinate value formed using the angle value and the reference information; and an output module coupled to the plotting module, the output module being adapted to output the graph to a display medium for display thereon.

BRIEF DESCRIPTION OF THE DRAWINGS

Other features and advantages of the present invention will become apparent in the following detailed description of the preferred embodiments with reference to the accompanying drawings, of which:

FIG. 14 is a schematic circuit block diagram of the graphing apparatus of the preferred embodiment, illustrating an exemplary hardware configuration for an angle-determining unit, in which the graphing apparatus may be used to process the completion rates.

DETAILED DESCRIPTION OF THE PREFERRED EMBODIMENTS

Figure 1:
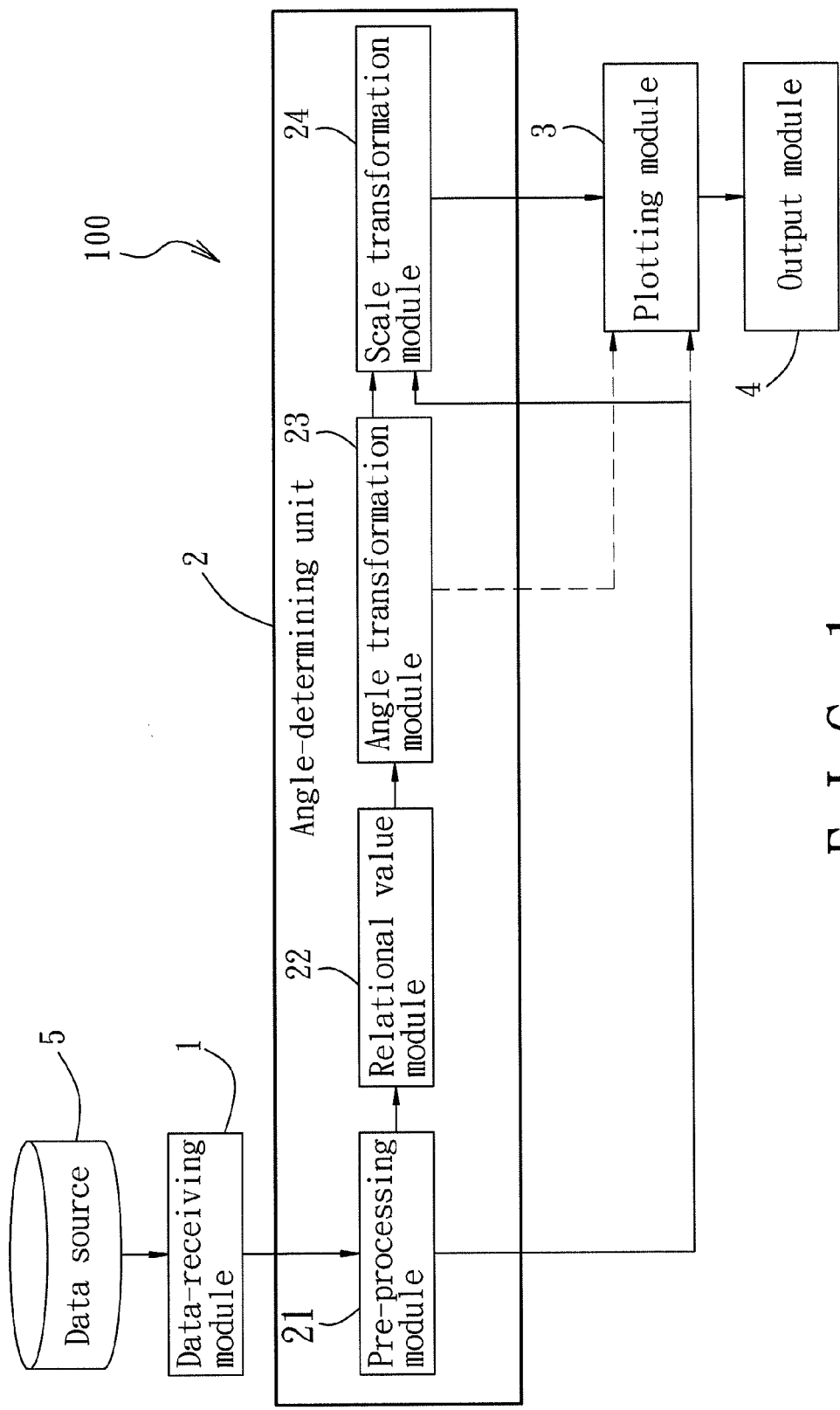
FIG. 1 is a schematic circuit block diagram of a graphing apparatus according to a preferred embodiment of the present invention.

Referring to FIG. 1, a graphing apparatus 100 according to a first preferred embodiment of the present invention comprises a data-receiving module for receiving data from a data source 5, an angle-determining unit 2 for determining angle values, a plotting module 3 for generating a graph having coordinate values, and an output module 4 for outputting the graph to a display medium (not shown) for display thereon.

The data source 5 may be an external storage medium such as an optical disc, a flash memory, etc., a memory in the graphing apparatus 100, or a memory that records data input by a user through an input device, such as a keyboard. The data source 5 records a first data set {x1, x2 ... xn}, a second data set {y1, y2 ... yn}, and a corresponding reference information set. In this embodiment, the number of values in the first data set is the same as the number of values in the second data set. If they are not the same, then deletion or other appropriate processing must be performed so that they are equal in number. For example, zero filling, filling using non-zero values which do not affect the numerical value distribution, etc. may be performed.

Figure 3:
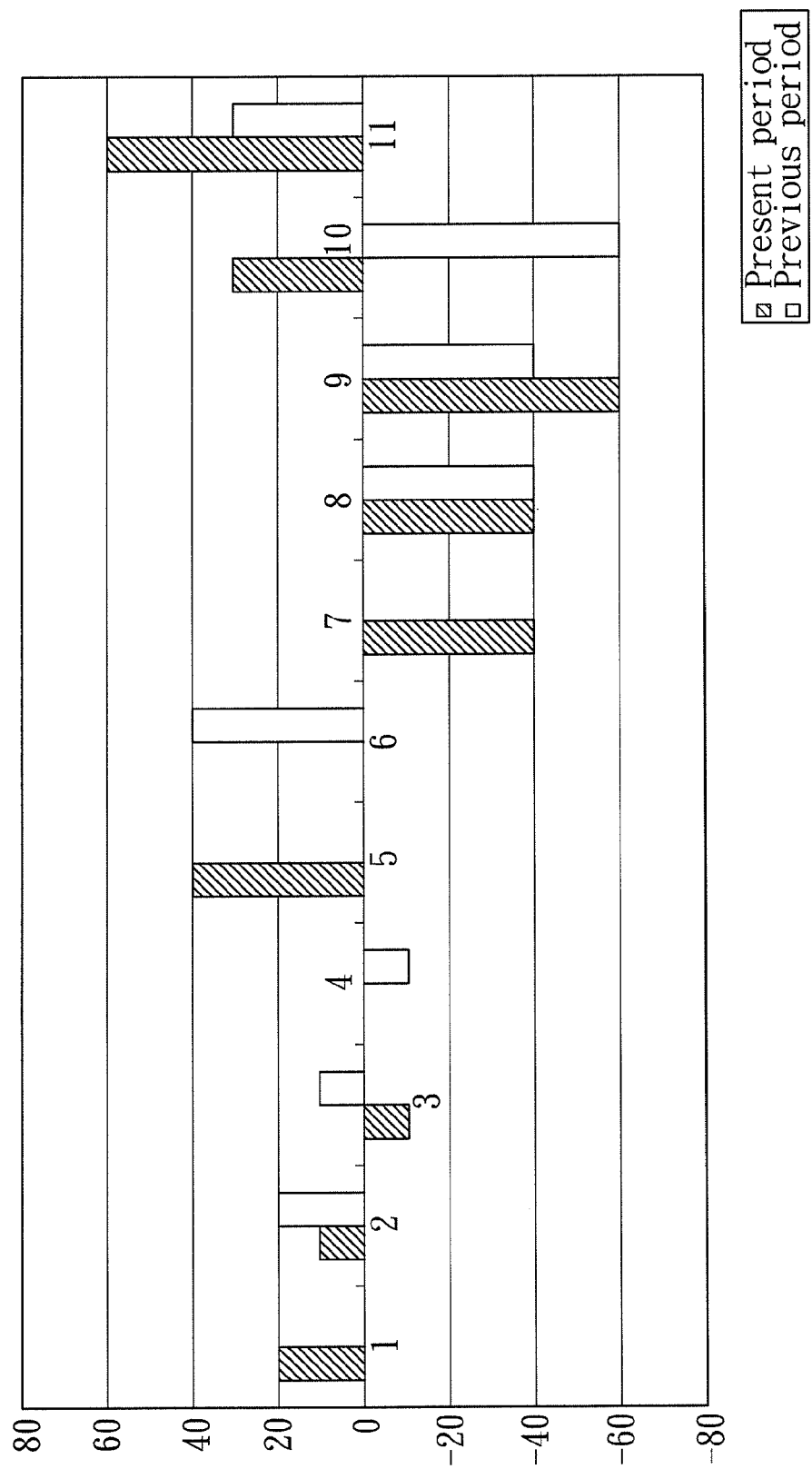
FIG. 3 is a bar graph of original, unprocessed values of a first data set and a second data set.
Figure 4:
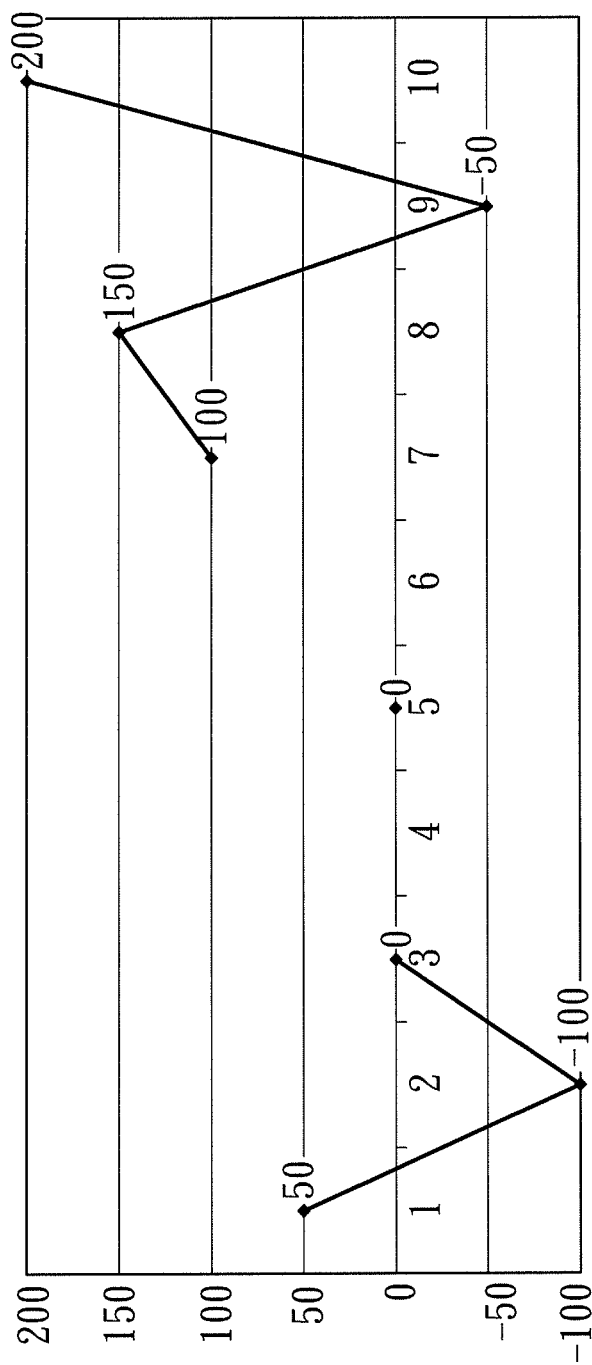
FIG. 4 is a line graph of completion rates generated from the original, unprocessed values of the first data set and the second data set.

Referring to FIGS. 3 and 4, the first data set may include values in a previous period and the second data set may include values in a present period. In this embodiment, it is desired to calculate relational values of the data of the present period and the data of the previous period. The relational values are referred to as completion rates, which are ratios between the values of the two data sets. Since there is no previous period at the beginning, the first value of "20" of the present period is deleted. Therefore, in this example, the first data set is {20, 10, −10 ... −60, 30}, the second data set is {10, −10, 0, ... 30, 60}, and the reference information set is a serial number set {1, 2 ... n} with a time implication. For example, the values in the reference information set may represent years. FIG. 4 is a graph of completion rates (values of present period/values of previous period×100%) prior to undergoing processing according to the present invention, illustrating how some of the points cannot be shown due to the fact that some of the values of the previous period are zero.

In some embodiments, a computer program product comprises a computer-readable storage medium that stores a graphing program for causing a central processing unit (not shown) of the graphing apparatus 100 to execute steps of a graphing method (to be described below). In such embodiments, with reference to FIG. 1, the central processing unit may function as the data-receiving module 1, the angle-determining unit 2, and the plotting module 3.

The angle-determining unit 2 includes a pre-processing module 21, a relational value module 22, an angle transformation module 23, and a scale transformation module 24.

In some embodiments, the data-receiving module 1 is a register of the central processing unit, the output module 4 is a display controller or a printer, and the display medium on which the output module 4 outputs the graph is a display device or a sheet of paper.

Figure 2:
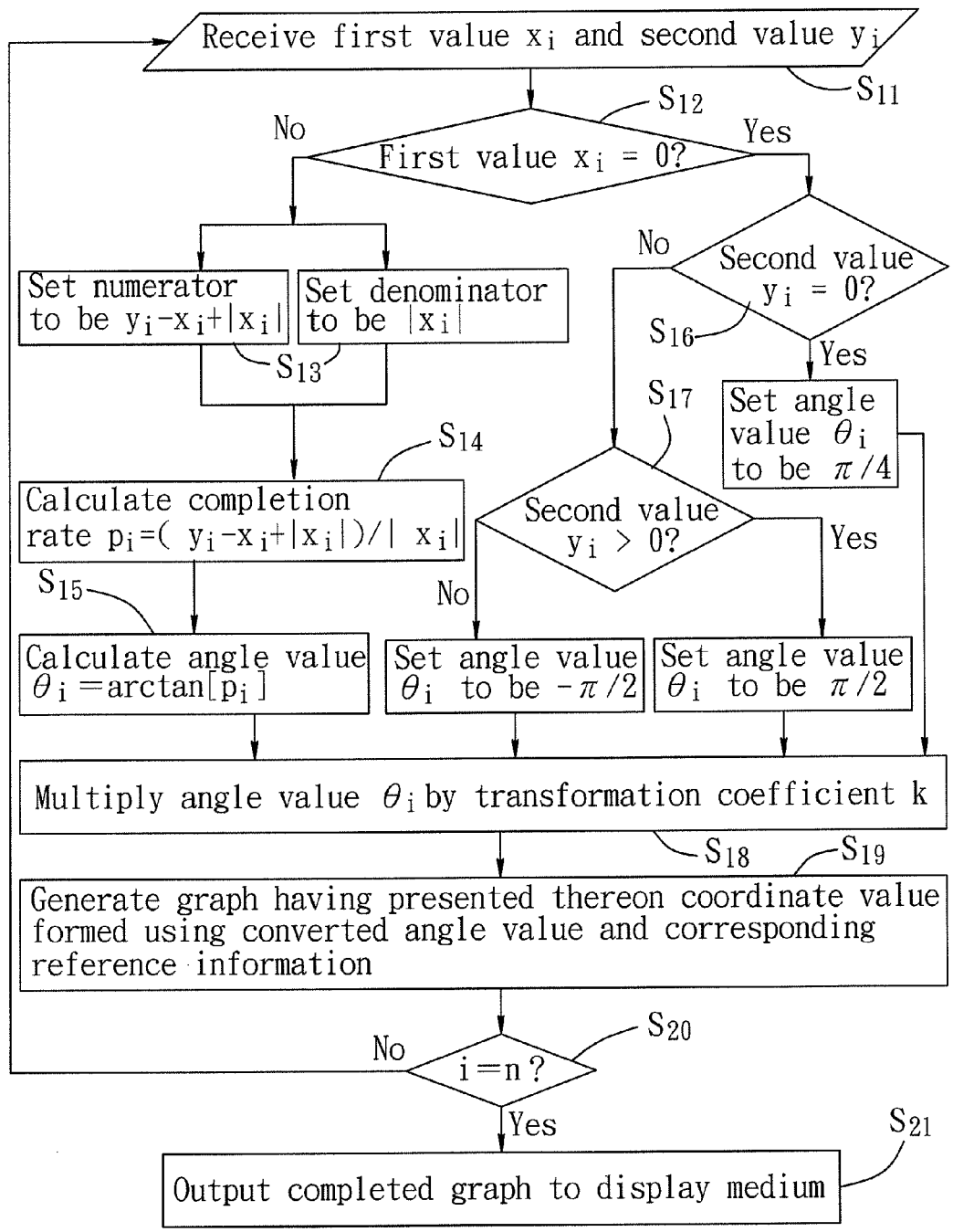
FIG. 2 is a flowchart of a graphing method according to a first preferred embodiment of the present invention.

Referring to FIGS. 1, 2, and 3, a graphing method according to a first preferred embodiment of the present invention will now be described.

First, in step $S_{11}$, the data-receiving module 1 receives a first value $x_i$ and a second value $y_i$, and reference information (i) corresponding to the first and second values $x_i$, $y_i$, where i=1~n. Taking the reference information having the serial number 1 as an example, the first value $x_1$ read (or received) in this step is 20 and the second value $y_1$ is 10.

Next, in Step $S_{12}$, the pre-processing module 21 of the angle-determining unit 2 determines if the first value $x_1$ is zero. If it is not, this means that the denominator of the completion rate for subsequent calculation is not zero, and hence the flow goes to Step $S_{13}$. On the other hand, if the first value $x_1$ is zero, this means that the denominator for subsequent calculation of the completion rate is zero, and so special processing is needed and the flow goes to Step $S_{16}$.

In Step $S_{13}$, the relational value module 22 of the angle-determining unit 2 sets the denominator used to obtain the relational value (which is the completion rate in this embodiment) to be a function of the first value $x_i$, which is the absolute value of the first value $x_i$ in this embodiment, and the numerator used to obtain the relational value to be a function of the first value $x_i$ and the second value $y_i$, which is $y_i - x_i + |x_i|$ in this embodiment.

In step $S_{14}$, the relational value module 22 performs division using the numerator and denominator obtained in Step $S_{13}$ to generate a completion rate as in the following:

$$p_i = (y_i - x_i + |x_i|)/|x_i| \qquad \text{Formula 1}$$

When i=1, $x_1$=20 and $y_1$=10 are substituted into Formula 1 to thereby obtain $p_1$=0.5. This may then be multiplied by 100% to obtain 50%. Using the aforementioned formula for calculating the completion rate p, this embodiment is capable of handling situations in which the denominator is negative. Since unreasonable results are obtained when the denominator x is negative, the origin (0, 0) of the orthogonal coordinate system is moved to (−2|x|, −2|x|) such that the original (x, x) in the third quadrant becomes (|x|, |x|) in the first quadrant, and the original (x, y) becomes the new coordinate of (x+2|x|, y+2|x|). When x<0, since |x|=−x, the new coordinate (x+2|x|, y+2|x|) is further transformed to (|x|, y−x+|x|), so that the completion rate p=(y−x+|x|)/|x| is obtained. When x>0, the result of p=y/x is maintained, and hence |x|=x. As such, the aforementioned formula can be used directly for calculating p.

In summary, the formula p=(y−x+|x|)/|x| used in calculating the completion rate in this embodiment overcomes the problem of obtaining unreasonable results when the denominator is negative.

Next, in step $S_{15}$, the angle transformation module of the angle-determining unit 2 processes the completion rate $p_i$ by a predetermined inverse trigonometric function so as to acquire an angle value $\theta_i$. In this embodiment, the predetermined inverse trigonometric function is an arctangent function as follows:

$$\theta_i = \arctan[(y_i - x_i + |x_i|)/|x_i|] \quad \text{Formula 2}$$

When i=1, $x_1$=20 and $y_1$=10 are substituted into Formula 2 to thereby obtain $\theta_1$=0.46. It should be noted that the originally acquired completion rate $p_i$ can take a value between ±∞, that is, when the denominator approaches 0, the value of $p_i$ becomes very large. Through this step, the completion rate $p_i$ is transformed into an angle value $\theta_i$ falling between ±π/2, which ensures that the graph generated by the subsequent steps does not need to undergo compression as a result of a very large completion rate $p_i$. Moreover, since the argument for the arctan function can have a zero or negative value, this embodiment allows for application to a greater variance of values when compared to the prior art, in which the logarithm algorithm used does not allow for the application of zero or negative values.

In step $S_{12}$, if it is determined that the first value $x_i$ is zero, then in step $S_{16}$, the pre-processing module 21 further determines whether the second value $y_i$ is zero. In the affirmative, the completion rate cannot be calculated. In this embodiment, the angle-determining unit 2 directly sets the angle value $\theta_i$ to be π/4 when such a situation occurs. Otherwise, the flow goes to Step $S_{17}$.

In step $S_{17}$, the pre-processing module 21 determines whether the second value $y_i$ is larger than zero. If it is, the completion rate becomes infinitely large. In this embodiment, when such a situation is encountered, the angle-determining unit 2 directly sets the angle value $\theta_i$ to be π/2. In the negative, the completion rate becomes infinitely small, in which case the angle-determining unit 2 directly sets the angle value $\theta_i$ to be −π/2.

Figure 5:
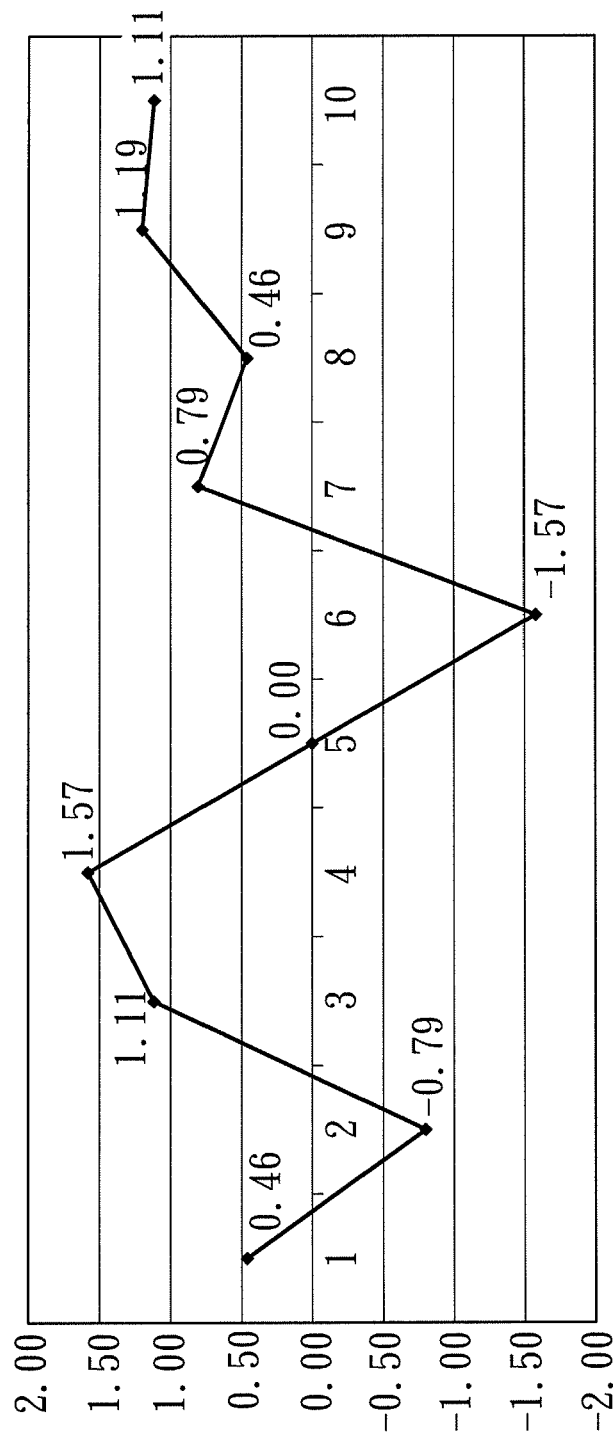
FIG. 5 is a line graph of completion rates generated after values of the first and second data sets have undergone processing according to the graphing method of the first preferred embodiment.

When all the values of the data sets are processed, in which some angle values are obtained by step $S_{15}$ and others by step $S_{16}$ or step $S_{17}$, the graph as shown in FIG. 5 can be drawn. In step $S_{18}$, all angle values $\theta_i$ obtained by step $S_{15}$, step $S_{16}$ or step $S_{17}$ are further processed by the scale transformation module 24. That is, in this embodiment, the angle values $\theta_1$ obtained by step $S_{15}$, step $S_{16}$ or step $S_{17}$ are in radians, and in step $S_{18}$, the scale transformation module 24 converts the angle values $\theta_1$ into degrees (in a 360° system), or into another scale such as subdividing a circle into 400 equal parts as desired. Subdividing a circle into 400 equal parts refers to subdividing a right angle into 100 grad. However, in this embodiment, this refers to multiplying the angle value θ by a transformation coefficient k=400/π, such that, when x=y, the transformed angle value θ(k)=θ×400/π=100. In the case of the value at the point i=1, $\theta_1(k)=\theta_1 \times 400/\pi$=59, which shows that in some embodiments, a two-hundredth part of a right angle can be used as a scale.

Figure 6:
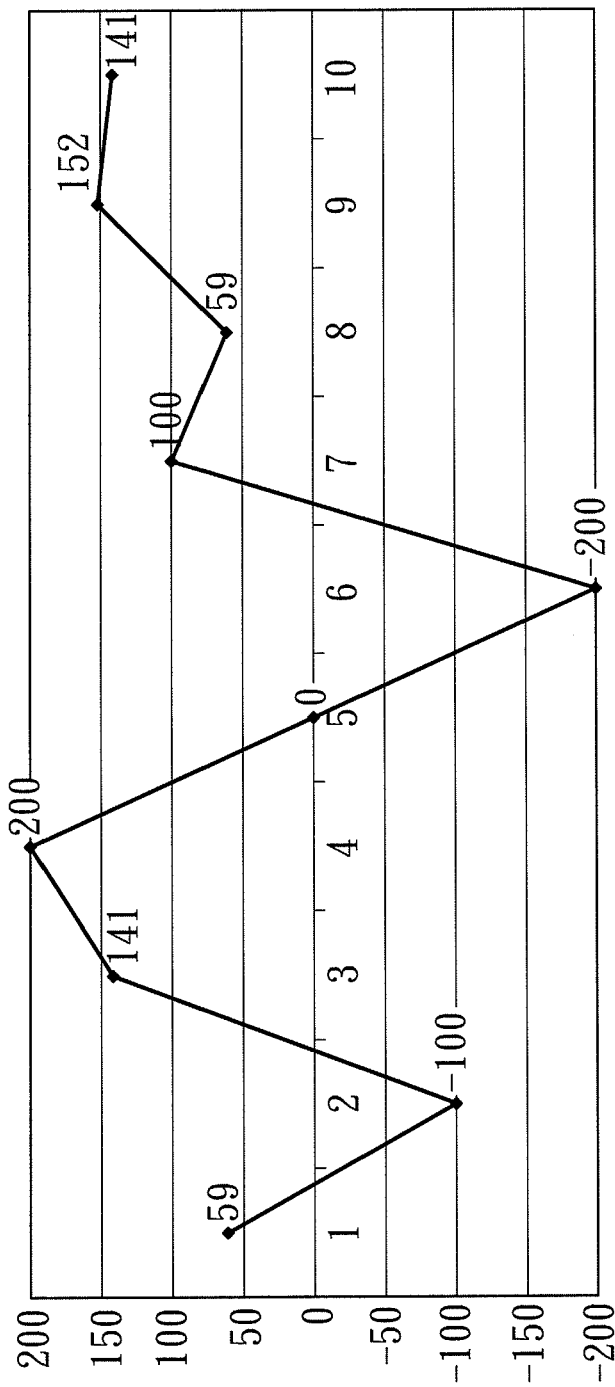
FIG. 6 is a line graph similar to FIG. 5, but illustrating the resulting line graph after further processing of the values of the first and second data sets using a predetermined transformation coefficient.

In step $S_{19}$, the plotting module 3 generates a graph having presented thereon the coordinate value formed using the converted angle value $\theta_1$ (k)=59 and the corresponding reference information "1," which is shown as the first point in FIG. 6.

Next, in step $S_{20}$, it is determined whether all values of the data sets have been processed, that is, whether i=n. In the negative, the flow goes back to step $S_{11}$ for processing the next pair of values. In the affirmative, the flow proceeds with step $S_{21}$, in which the output module 4 outputs the completed graph as shown in FIG. 6 to the display medium mentioned above for display thereon.

Figure 7:
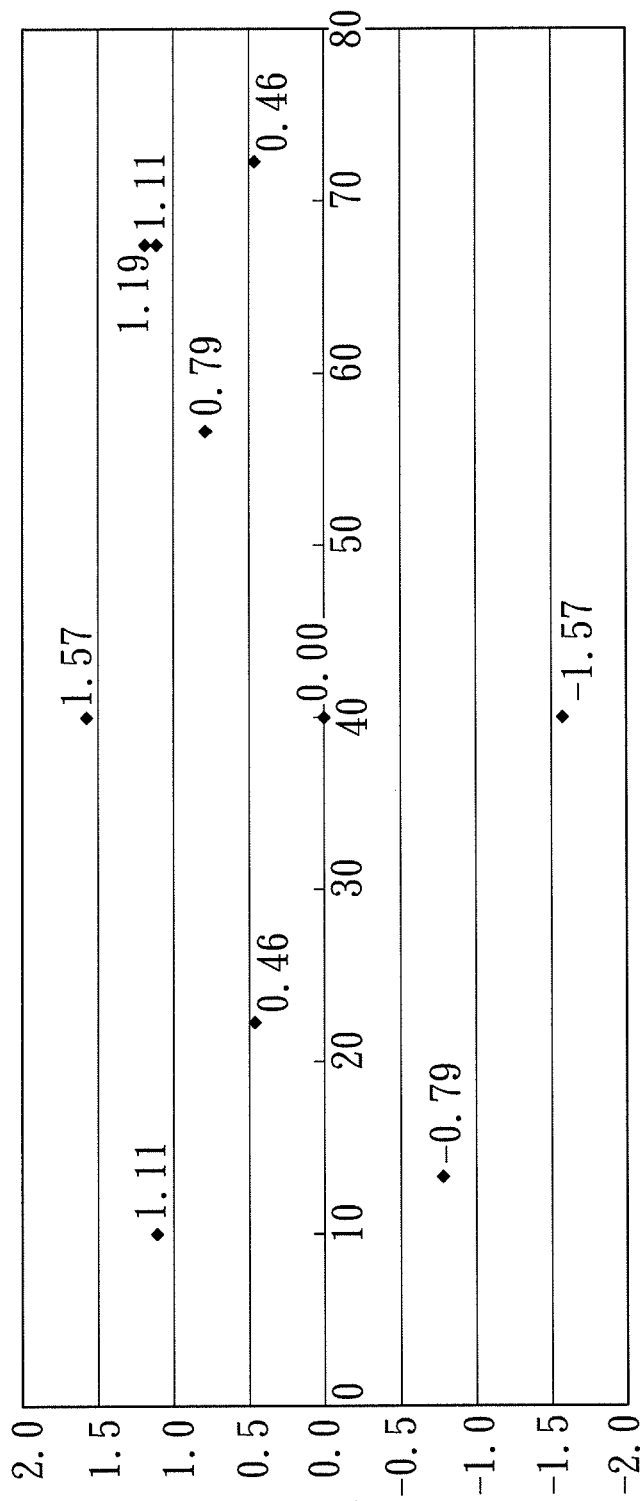
FIG. 7 is a dot graph generated according to the present invention for illustrating the relation between the data sets and the completion rates, in which each point of the abscissa axis is a square root of the sum of squares of a first datum and a second datum.
Figure 8:
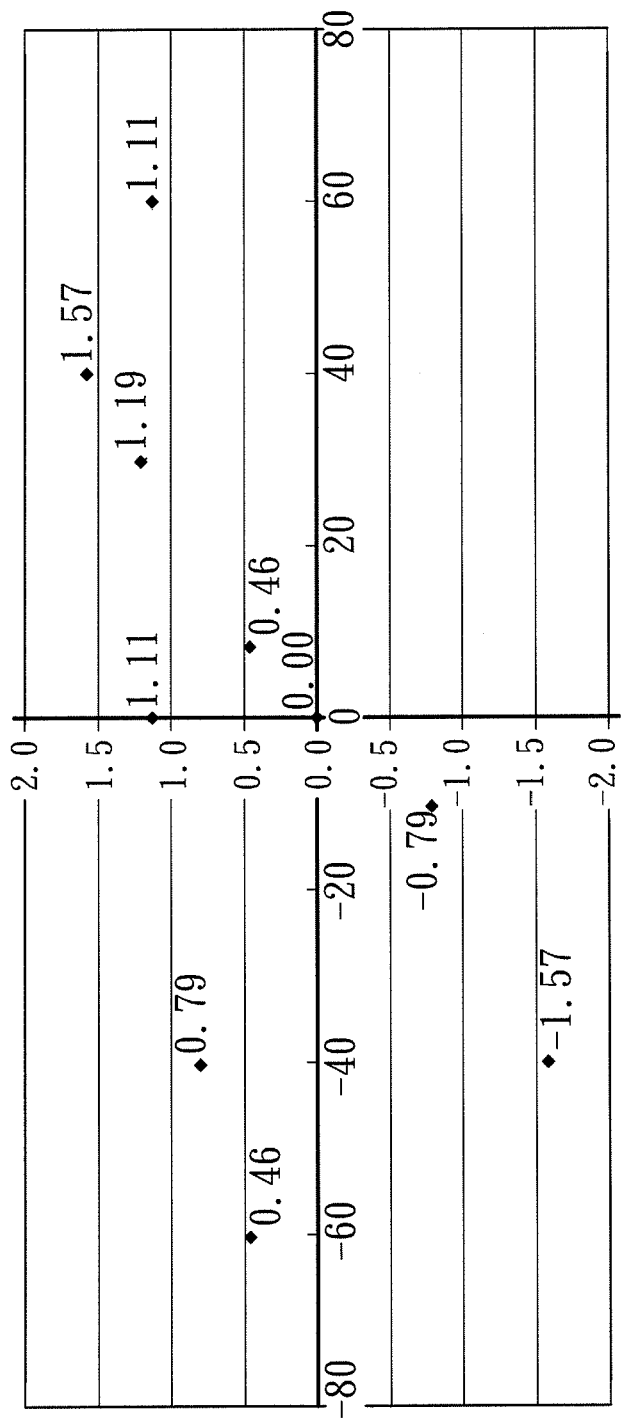
FIG. 8 is a dot graph similar to FIG. 7, in which each point of the abscissa axis is a second datum.
Figure 9:
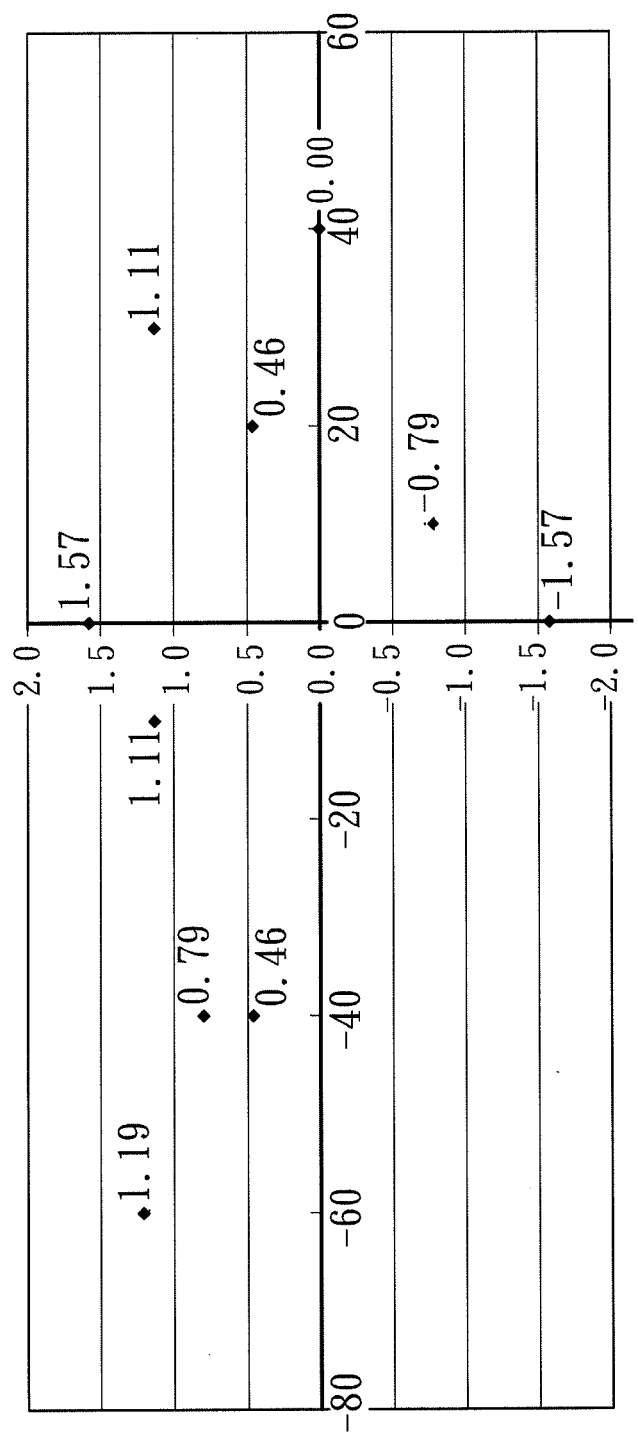
FIG. 9 is a dot graph similar to FIG. 7, in which each point of the abscissa axis is a first datum.

It is to be noted that, in the aforementioned FIG. 6, the abscissa coordinates are serial numbers with a time implication, and the ordinate coordinates are transformed angle values θ(k), so that those viewing the graph are able to easily figure out how the completion rates vary with time. However, the manner of presenting the graph of this invention is not limited in this regard, and the angle values may be the abscissa coordinates whereas the time serial numbers may be the ordinate coordinates. Furthermore, the reference information suitable for this invention is not restricted to serial numbers only, and the reference information may be subject headings, numerical values, etc. Taking numerical values for the reference information as an example, each of the abscissa coordinates may be a square root of the sum of a square of the present period value and a square of the previous period value, and the ordinate coordinates may be maintained as the angle values acquired in Step $S_{18}$ to thereby obtain the graph of FIG. 7. In FIG. 7, it is easy to determine which completion rates are especially high or especially low, and the points with the numerical values that are especially large (that is, the points adjacent to the right top corner or the right bottom corner) often represent values that the reader of the graph is most concerned with. Similarly, the abscissa coordinates are not restricted to what is disclosed herein. For instance, the abscissa axis can be used for the present period values to thereby result in the graph as shown in FIG. 8 which is convenient for locating data with the completion rate that is especially high or especially low, and with the present period value that is especially large. Of course, the abscissa coordinates may as well take the previous period values to thereby result in the graph as shown in FIG. 9 which is convenient for locating data with completion rates that are especially high or especially low, and with the previous period values that are especially large.

Furthermore, taking as an example the reference information received from the data source 5 being subject headings, with the abscissa axis representing headings such as "interest income," "processing fee income," "ticket income," "business income," "business net profit," etc., and the ordinate coordinates remaining the angle values acquired in Step $S_{18}$, the completion rates of each heading for overall comparison can be acquired.

Figure 10:
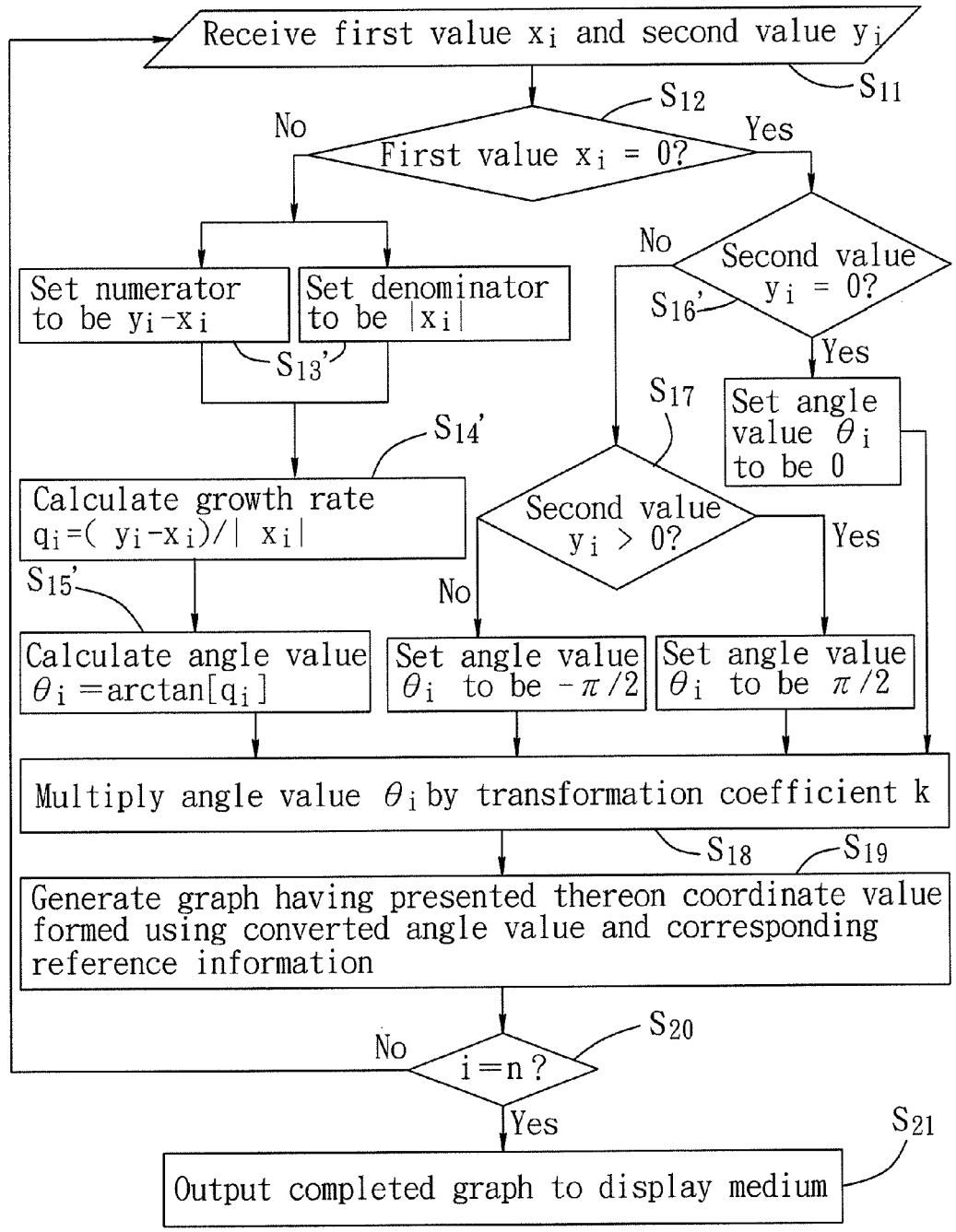
FIG. 10 is a flowchart of a graphing method according to a second preferred embodiment of the present invention.

Referring to FIGS. 1 and 10, a graphing method according to the second preferred embodiment of the present invention is different from the graphing method of the first preferred embodiment in that, the relational values calculated by the relational value module 22 are growth rates, and part of the setup of the pre-processing module 21 is also different.

Figure 11:
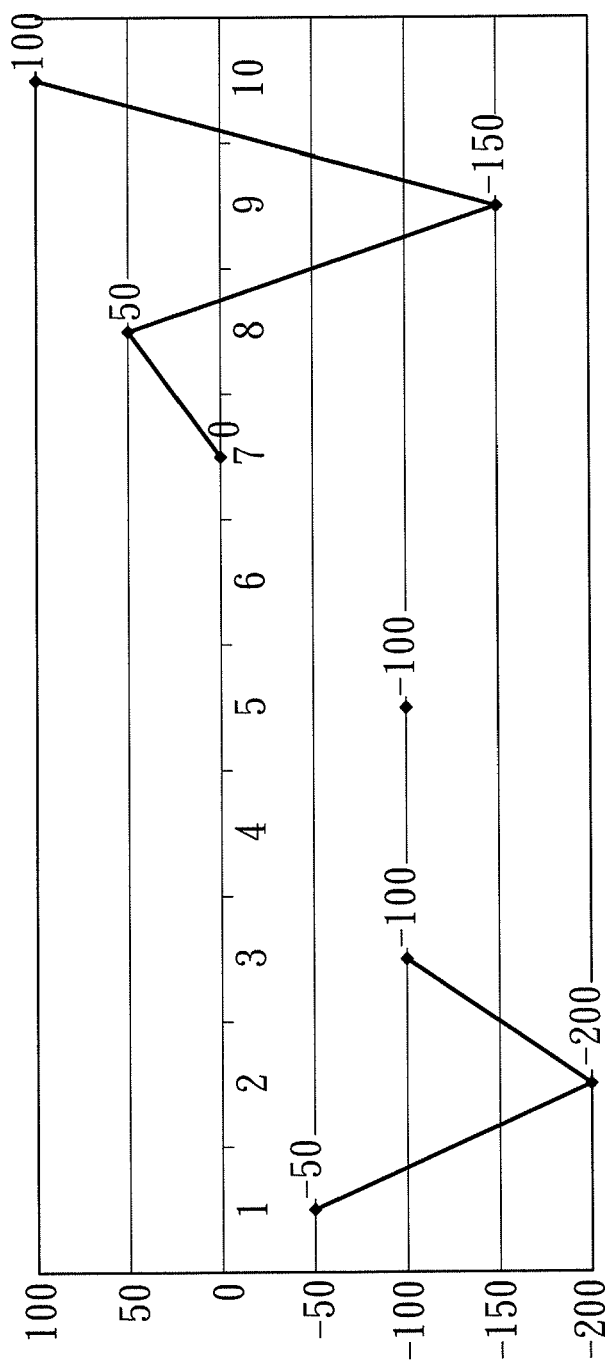
FIG. 11 is a line graph of growth rates generated from original, unprocessed values of the first data set and the second data set.

Using the same first and second data sets, each of the growth rates is the difference between the present period and the previous period corresponding to the same reference information divided by the previous period. Before processing using this embodiment, the graph obtained using the serial numbers as the reference information for the abscissa axis and using the growth rates for the ordinate axis is as shown in FIG. 11.

The second preferred embodiment of the graphing method according to this invention differs from the first preferred embodiment in the manner as described below.

In step $S_{13}'$, the relational value module 22 of the angle-determining unit 2 sets the denominator used to obtain the relational value (the growth rate in this embodiment) to be the absolute value of the first value $x_i$, and the numerator to be $y_i-x_i$.

Next, in step $S_{14}'$, the relational value module 22 performs division using the denominator and the numerator acquired in Step $S_{13}'$, thereby obtaining the growth rate as follows:

$$q_i=(y_i-x_i)/|x_i| \quad \text{(Formula 3)}$$

In step $S_{15}'$, the angle transformation module 23 uses the growth rate $q_i$ as the input in the arctangent function so as to acquire an angle value $\theta_i$ as follows:

$$\theta_i=\arctan[(y_i-x_i)/|x_i|] \quad \text{(Formula 4)}$$

In step $S_{16}'$, if the second value $y_i$ is determined to be zero, this indicates that both the previous period value and the present period value are zeros, and so the growth rate cannot be calculated. As a result, in this embodiment, the angle-determining unit 2 sets the angle value $\theta_i$ to be 0.

Figure 12:
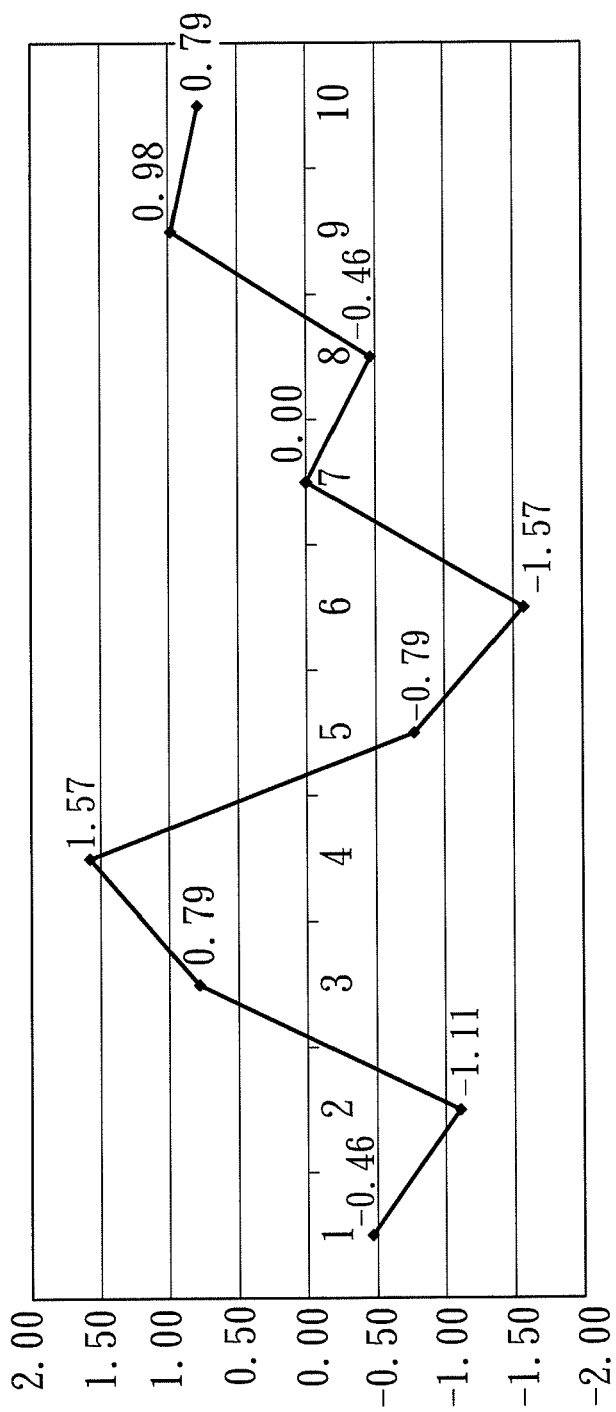
FIG. 12 is a line graph of growth rates generated after values of the first and second data sets have undergone processing according to the second preferred embodiment.
Figure 13:
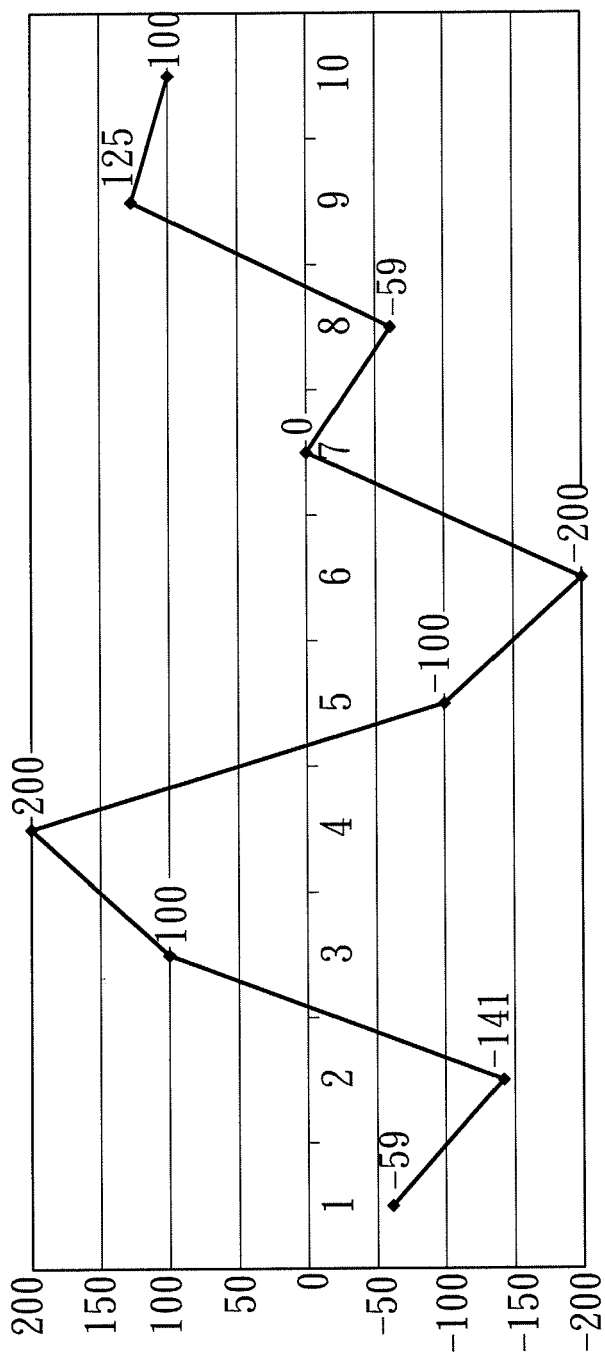
FIG. 13 is a line graph similar to FIG. 12, but illustrating the resulting line graph after further processing of the values of the first and second data sets using a predetermined transformation coefficient.

If the plotting module 3 acquires the angle values $\theta_i$ by step $S_{15}'$, step $S_{16}'$, or $S_{17}$ and prepares a graph having presented thereon coordinate values formed using these angle values and the reference information, the graph as shown in FIG. 12 can be obtained. If the plotting module 3 prepares a graph having presented thereon coordinate values formed using the converted angle values and the reference information, the graph as shown in FIG. 13 can be obtained.

Referring to FIG. 14, an exemplary hardware configuration of the angle-determining unit 2 is shown. In this exemplary embodiment, the graphing apparatus 100 is configured to generate completion rates. In this exemplary embodiment, the angle-determining unit 2 includes a first multiplexer 60, a comparator 61, a controller 62, a computing unit 63, an angle transformation module 64, a second multiplexer 65, and a multiplier 66. In some embodiments, the foregoing controller 62 is a finite state machine, and the computing unit 63 is an arithmetic logic unit (ALU).

First, the controller 62 sends a control signal to the first multiplexer 60 for reading a first value x from the data-receiving module 1, and then the first multiplexer 60 sends the result to the comparator 61 such that the comparator 61 compares the first value x and 0 (i.e., step $S_{12}$ is performed).

When the comparison result shows x is not equal to 0, the controller 62 sends a control signal to the computing unit 63 so as to cause the computing unit 63 to perform step $S_{13}$ and step $S_{14}$, that is, to read the first value x and the second value y, to use an adder and a subtractor in the computing unit 63 to obtain the numerator and/or the denominator, and then to obtain the completion rate using a divider for subsequent transmission to the angle transformation module 64 to cause the same to perform step $S_{15}$.

If the comparison result shows x is equal to 0, the controller 62 sends a control signal to the first multiplexer 60 and reads the second value y from the data-receiving module 1, and then the first multiplexer 60 sends the result to the comparator 61, such that the comparator 61 makes a comparison between the second value y and 0 (that is, performs step $S_{16}$). Next, the comparator 61 sends the comparison result (of the comparison between the second value y and 0) to the controller 62, and then the controller 62 controls the second multiplexer 65 according to the comparison result as follows: when y=0, the result of $\theta=\pi/4$ is output (step $S_{16}$), when y>0, the result of $\theta=\pi/2$ is output (step $S_{17}$), and when y<0, the result of $\theta=-\pi/2$ is output (step $S_{17}$).

The output results of the angle transformation module 64 and the second multiplexer 65 are sent to an exclusive-OR gate, which sends only one output to the multiplier 66, and the multiplier 66 multiplies the result sent by the exclusive-OR gate by a value (k), and thereby performs scale transformation (that is, step $S_{18}$). Finally, the plotting module 3 acquires the transformed angle values and corresponding reference information (read from the data-receiving module 1) so as to generate a graph.

Figure 15:
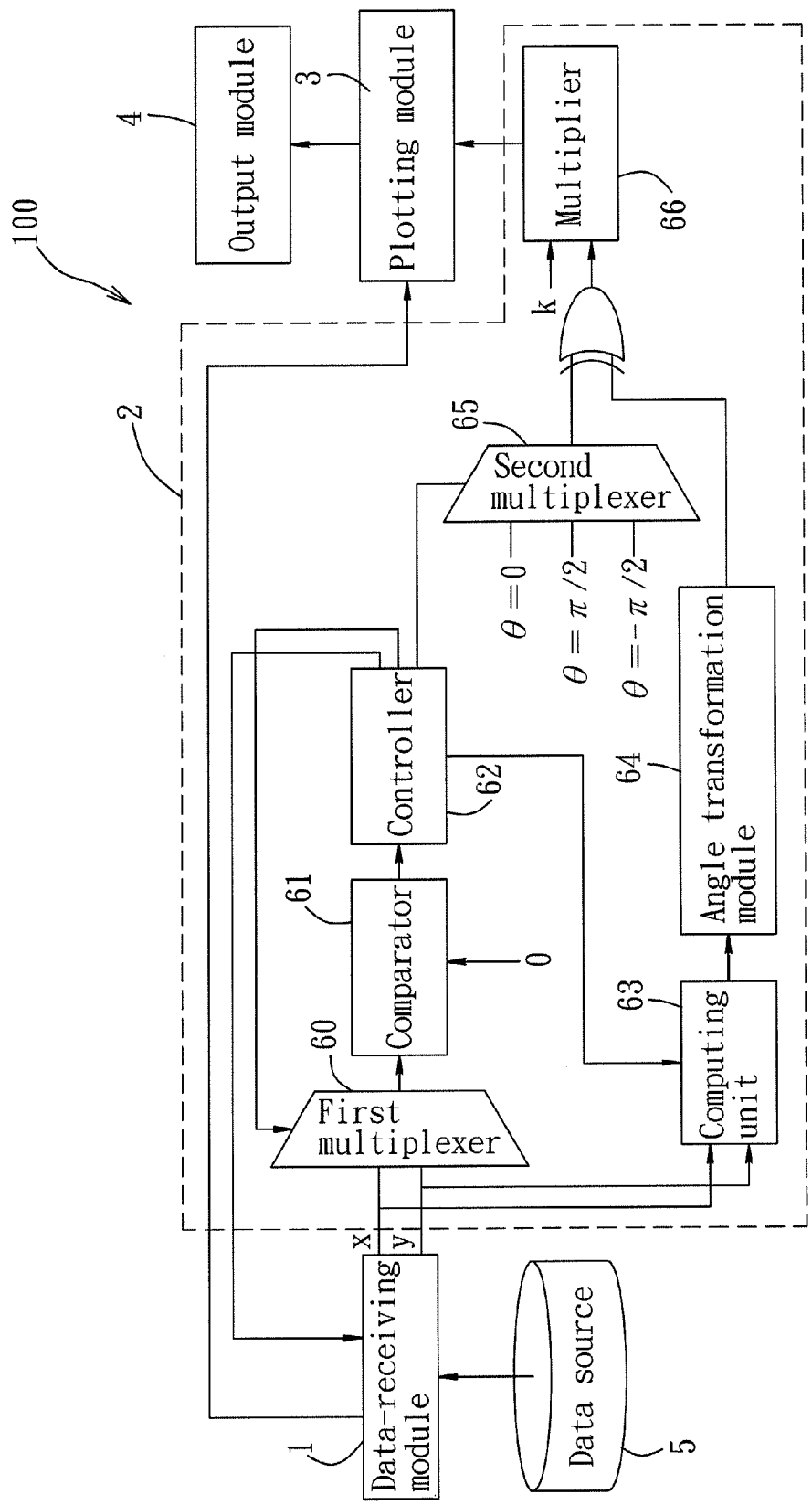
FIG. 15 is a schematic circuit block diagram similar to FIG. 14, but illustrating how the graphing apparatus may be used to process growth rates.

Referring to FIG. 15, the angle-determining unit 2 may be slightly modified so as to enable the same to perform steps $S_{12}$, $S_{13}'$, $S_{14}'$, $S_{15}'$, $S_{16}'$, $S_{17}$, and $S_{18}$ related to determining growth rates. In particular, the computing unit 63 and the angle transformation module 64 may be altered slightly so as to calculate growth rates, and input of the second multiplexer 65 may be changed to $\theta=0$ or $\pm\pi/2$ as shown in FIG. 15.

In summary, using the pre-processing module 21 of the graphing apparatus 100 according to the present invention, instances in which the denominator is zero can be handled, and using the relational value module 22, instances in which the denominator is negative can be handled. As a result, both the completion rate and the growth rate can be displayed on a graph. Furthermore, the angle transformation module 23 of this invention transforms values distributed between $\pm\infty$ into angle values ranging between $\pm\pi/2$, and then the scale transformation module 24 performs scale adjustment as needed, such that no graph compression is required.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A graphing method to be implemented by a graphing apparatus that includes a receiving module, an angle-determining unit, a plotting module, and an output module, said graphing method comprising:
   (a) configuring the receiving module to receive a first value and a second value, and reference information corresponding to the first and second values;
   (b) configuring the angle-determining unit to determine an angle value using the first value and the second value, step (b) including
      (b-0) configuring a pre-processing module of the angle-determining unit to determine if the first value is zero,
      (b-1) if the first value is not zero, configuring a relational value module of the angle-determining unit to calculate a relational value by determining the quotient of a numerator and a denominator, in which the denominator is a function of the first value and the numerator is a function of the second value,
      (b-2) if the first value is not zero, configuring an angle transformation module of the angle-determining unit to obtain the angle value by inputting the relational value in a predetermined inverse trigonometric function, and (b-3) if the first value is zero, configuring the pre-processing module to determine the sign of the second value, the angle-determining unit being configured to set the angle value to a maximum value of the range of the inverse trigonometric function when the sign of the second value is positive, the angle-determining unit being configured to set the angle value to a minimum value of the range of the inverse trigonometric function when the sign of the second value is negative;

(c) configuring the plotting module to generate a graph having presented thereon a coordinate value formed using the angle value and the reference information; and (d) configuring the output module to output the graph to a display medium for display thereon.

2. The graphing method of claim 1, wherein, in step (b-1), the denominator used to obtain the relational value is the absolute value of the first value, and the numerator used to obtain the relational value is a function of the first value and the second value.

3. The graphing method of claim 1, wherein, in step (b-2), the inverse trigonometric function is an arctangent function.

4. The graphing method of claim 1, wherein, in step (b-3), the pre-processing module is further configured to determine whether the second value is zero, the angle-determining unit being configured to set the angle value to be one of zero and $\pi/4$ when the second value is zero.

5. The graphing method of claim 4, wherein, in step (b-3), the angle-determining unit is configured to set the angle value to be $\pi/4$ when the second value is zero and when the relational value module is configured to set the numerator to be the second value minus the first value plus the absolute value of the first value.

6. The graphing method of claim 4, wherein, in step (b-3), the angle-determining unit is configured to set the angle value to be zero when the second value is zero and when the relational value module is configured to set the numerator to be the second value minus the first value.

7. The graphing method of claim 2, wherein, in step (b-1), the relational value module is configured to set the numerator to be one of the second value minus the first value, and the second value minus the first value plus the absolute value of the first value.

8. The graphing method of claim 1, wherein:
in step (b-2), the angle value obtained by the angle transformation module is in radians;
step (b) further includes configuring a scale transformation module of the angle-determining unit to convert the angle value in radians into one of degrees, grad, and a two-hundredth part of a right angle; and
in step (c), the plotting module is configured to generate the graph having presented thereon the coordinate value formed using the converted angle value and the reference information.

9. The graphing method of claim 1, wherein the reference information is one of a subject heading, a time value, and a numerical value.

10. A computer program product comprising a non-transitory computer-readable storage medium that stores a graphing program for causing a graphing apparatus that includes a receiving module, an angle-determining unit, a plotting module, and an output module to execute steps of a graphing method including:

(a) configuring the receiving module to receive a first value and a second value, and reference information corresponding to the first and second values;

(b) configuring the angle-determining unit to determine an angle value using the first value and the second value, step (b) including (b-0) configuring a pre-processing module of the angle-determining unit to determine if the first value is zero, (b-1) if the first value is not zero, configuring a relational value module of the angle-determining unit to calculate a relational value by determining the quotient of a numerator and a denominator, in which the denominator is a function of the first value and the numerator is a function of at least the second value, (b-2) if the first value is not zero, configuring an angle transformation module of the angle-determining unit to obtain the angle value by inputting the relational value in a predetermined inverse trigonometric function, and (b-3) if the first value is zero, configuring the pre-processing module to determine the sign of the second value, the angle-determining unit being configured to set the angle value to a maximum value of the range of the inverse trigonometric function when the sign of the second value is positive, the angle-determining unit being configured to set the angle value to a minimum value of the range of the inverse trigonometric function when the sign of the second value is negative; and (c) configuring the plotting module to generate a graph having presented thereon a coordinate value formed using the angle value and the reference information; and (d) configuring the output module to output the graph to a display medium for display thereon.

11. The computer program product of claim 10, wherein, in step (b-1), the denominator used to obtain the relational value is the absolute value of the first value, and the numerator used to obtain the relational value is a function of the first value and the second value.

12. The computer program product of claim 10, wherein, in step (b-2), the inverse trigonometric function is an arctangent function.

13. The computer program product of claim 10, wherein, in step (b-3), the pre-processing module is further configured to determine whether the second value is zero, the angle-determining unit being configured to set the angle value to be one of zero and $\pi/4$ when the second value is zero.

14. The computer program product of claim 13, wherein, in step (b-3), the angle-determining unit is configured to set the angle value to be $\pi/4$ when the second value is zero and when the relational value module is configured to set the numerator to be the second value minus the first value plus the absolute value of the first value.

15. The computer program product of claim 13, wherein, in step (b-3), the angle-determining unit is configured to set the angle value to be zero when the second value is zero and when the relational value module is configured to set the numerator to be the second value minus the first value.

16. The computer program product of claim 11, wherein, in step (b-1), the relational value module is configured to set the numerator to be one of the second value minus the first value, and the second value minus the first value plus the absolute value of the first value.

17. The computer program product of claim 10, wherein:
in step (b-2), the angle value obtained by the angle transformation module is in radians;

step (b) further includes configuring a scale transformation module of the angle-determining unit to convert the angle value in radians into one of degrees, grad, and a two-hundredth part of a right angle; and in step (c), the plotting module is configured to generate the graph having presented thereon the coordinate value formed using the converted angle value and the reference information.

18. The computer program product of claim 10, wherein the reference information is one of a subject heading, a time value, and a numerical value.

19. A graphing apparatus comprising:
a data-receiving module for receiving a first value and a second value, and reference information corresponding to the first and second values;
an angle-determining unit coupled to said data-receiving module to receive the first and second values therefrom, said angle-determining unit determining an angle value using the first value and the second value, said angle-determining unit including
a relational value module for calculating a relational value by determining the quotient of a numerator and a denominator, in which the denominator is a function of the first value, and the numerator is a function of at least the second value, and
an angle transformation module for obtaining the angle value by inputting the relational value in a predetermined inverse trigonometric function;
a plotting module coupled to said data-receiving module and said angle-determining unit, said plotting module generating a graph having presented thereon a coordinate value formed using the angle value and the reference information; and
an output module coupled to said plotting module, said output module being adapted to output the graph to a display medium for display thereon,
wherein said angle-determining unit further includes a pre-processing module for determining if the first value is zero, said relational value module calculating the relational value and said angle transformation module obtaining the angle value if the first value is not zero; and
if the first value is zero, said pre-processing module determining the sign of the second value, said angle-determining unit setting the angle value to a maximum value of the range of the inverse trigonometric function when the sign of the second value is positive, said angle-determining unit setting the angle value to a minimum value of the range of the inverse trigonometric function when the sign of the second value is negative.

20. The graphing apparatus of claim 19, wherein the denominator used to obtain the relational value is the absolute value of the first value, and the numerator used to obtain the relational value is a function of the first value and the second value.

21. The graphing apparatus of claim 19, wherein said pre-processing module further determines whether the second value is zero, said angle-determining unit setting the angle value to be one of zero and $\pi/4$ when the second value is zero.

* * * * *